(12) United States Patent
Laroche et al.

(10) Patent No.: US 11,050,902 B2
(45) Date of Patent: *Jun. 29, 2021

(54) VIDEO ENCODING AND DECODING

(71) Applicant: CANON KABUSHIKI KAISHA, Tokyo (JP)

(72) Inventors: Guillaume Laroche, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,601

(22) Filed: Jan. 17, 2020

(65) Prior Publication Data

US 2020/0154000 A1    May 14, 2020

Related U.S. Application Data

(63) Continuation of application No. 16/129,686, filed on Sep. 12, 2018, now Pat. No. 10,574,863, which is a
(Continued)

(30) Foreign Application Priority Data

Jan. 11, 2011 (GB) ...................................... 1100434

(51) Int. Cl.
*H04N 5/14* (2006.01)
*H04N 19/52* (2014.01)
(Continued)

(52) U.S. Cl.
CPC ........... *H04N 5/145* (2013.01); *H04N 19/139* (2014.11); *H04N 19/513* (2014.11); *H04N 19/52* (2014.11);
(Continued)

(58) Field of Classification Search
CPC ...... H04N 7/50; H04N 7/26244; H04N 7/462; H04N 5/145; H04N 7/26271; H04N 7/26031
See application file for complete search history.

(56) References Cited

U.S. PATENT DOCUMENTS 6,608,866 B1 *  8/2003  Saunders ............. H04N 19/159
                                                     375/240.16
9,008,182 B2 *  4/2015  Tsai ....................... H04N 19/56
                                                     375/240.16
(Continued)

*Primary Examiner* — Shawn S An
(74) *Attorney, Agent, or Firm* — Canon U.S.A., Inc. IP Division

(57) ABSTRACT

A set of spatial motion information predictors to be encoded is generated from among spatial motion information predictors respectively associated with predetermined image portions adjacent to an image portion to be decoded, one of which is situated left of the image portion to be decoded. At least one condition is used to determine that a spatial motion information predictor is not includable in the set. At least one condition is a condition to exclude from the generated set of spatial motion information predictors a spatial motion information predictor that is a duplicate of another spatial motion information predictor. A temporal motion information predictor is not subjected to the duplicate exclusion condition used for the spatial motion information predictors and may be a duplicate of a spatial motion information predictor in the generated set. A motion information predictor is selected from among (i) the generated set of motion information predictors, (ii) the temporal motion information predictor, and (iii) a zero motion information predictor as a replacement for a non-includable spatial motion information predictor.

3 Claims, 9 Drawing Sheets

Related U.S. Application Data continuation of application No. 15/477,665, filed on Apr. 3, 2017, now Pat. No. 10,097,738, which is a continuation of application No. 13/346,012, filed on Jan. 9, 2012, now Pat. No. 9,648,341.

(51) Int. Cl.

| | | |
|---|---|---|
| *H04N 19/139* | (2014.01) | |
| *H04N 19/513* | (2014.01) | |
| *H04N 19/527* | (2014.01) | |
| *H04N 19/53* | (2014.01) | |
| *H04N 19/533* | (2014.01) | |
| *H04N 19/55* | (2014.01) | |
| *H04N 19/57* | (2014.01) | |
| *H04N 19/573* | (2014.01) | |

(52) U.S. Cl.
CPC ........... *H04N 19/527* (2014.11); *H04N 19/53* (2014.11); *H04N 19/533* (2014.11); *H04N 19/55* (2014.11); *H04N 19/57* (2014.11); *H04N 19/573* (2014.11)

(56) References Cited

U.S. PATENT DOCUMENTS

| | | | |
|---|---|---|---|
| 9,131,237 B2* | 9/2015 | Lee | H04N 19/105 |
| 10,097,738 B2* | 10/2018 | Laroche | H04N 5/145 |
| 10,574,863 B2* | 2/2020 | Laroche | H04N 19/53 |
| 2002/0012396 A1* | 1/2002 | Pau | H04N 5/145 |
| | | | 375/240.16 |
| 2006/0280253 A1* | 12/2006 | Tourapis | H04N 19/513 |
| | | | 375/240.16 |
| 2012/0106638 A1* | 5/2012 | Su | H04N 19/56 |
| | | | 375/240.16 |
| 2012/0134415 A1 | 5/2012 | Lin et al. | |
| 2013/0301734 A1* | 11/2013 | Gisquet | H04N 19/89 |
| | | | 375/240.16 |

* cited by examiner

VIDEO ENCODING AND DECODING

CROSS-REFERENCE TO RELATED APPLICATIONS

This application is a continuation of U.S. patent application Ser. No. 16/129,686, presently pending, filed on Sep. 12, 2018, which is a continuation, and claims the benefit, of U.S. patent application Ser. No. 15/477,665, filed on Apr. 3, 2017 and issued as U.S. Pat. No. 10,097,738 on Oct. 9, 2018, which is a continuation, and claims the benefit, of U.S. patent application Ser. No. 13/346,012, filed on Jan. 9, 2012 and issued as U.S. Pat. No. 9,648,341 on May 9, 2017, and claims the benefit under 35 U.S.C. § 119(a)-(d) of United Kingdom Patent Application No. 1100434.8, filed on Jan. 11, 2011 and entitled "Video encoding and decoding with improved error resilience". The above cited patent applications are hereby incorporated by reference herein in their entireties.

BACKGROUND OF THE INVENTION

Field of the Invention

The invention relates to a method and device for encoding a sequence of digital images and a method and device for decoding a corresponding bitstream.

The invention belongs to the field of digital signal processing, and in particular to the field of video compression using motion compensation to reduce spatial and temporal redundancies in video streams.

Description of the Related Art

Many video compression formats, for example H.263, H.264, MPEG-1, MPEG-2, MPEG-4, SVC, use block-based discrete cosine transform (DCT) and motion compensation to remove spatial and temporal redundancies. They can be referred to as predictive video formats. Each frame or image of the video signal is divided into slices which are encoded and can be decoded independently. A slice is typically a rectangular portion of the frame, or more generally, a portion of an image. A slice may comprise an entire image of the video sequence. Further, each slice is divided into macroblocks (MBs), and each macroblock is further divided into blocks, typically blocks of 8×8 pixels. The encoded frames are of two types: temporal predicted frames (either predicted from one reference frame called P-frames or predicted from two reference frames called B-frames) and non temporal predicted frames (called Intra frames or I-frames).

Temporal prediction consists in finding in a reference frame, either a previous or a future frame of the video sequence, an image portion or reference area which is the closest to the block to encode. This step is known as motion estimation. Next, the difference between the block to encode and the reference portion is encoded (motion compensation), along with an item of motion information relative to the motion vector which indicates the reference area to use for motion compensation.

In order to further reduce the cost of encoding motion information, it has been proposed to encode a motion vector by difference from a motion vector predictor, typically computed from the motion vectors of the blocks surrounding the block to encode.

In H.264, motion vectors are encoded with respect to a median predictor computed from the motion vectors situated in a causal neighbourhood of the block to encode, for example from the blocks situated above and to the left of the block to encode. Only the difference, also called residual motion vector, between the median predictor and the current block motion vector is encoded.

The encoding using residual motion vectors saves some bitrate, but necessitates that the decoder performs the same computation of the motion vector predictor in order to decode the value of the motion vector of a block to decode.

Recently, further improvements have been proposed, such as using a plurality of possible motion vector predictors. This method, called motion vector competition, consists in determining between several motion vector predictors or candidates which motion vector predictor minimizes the encoding cost, typically a rate-distortion cost, of the residual motion information. The residual motion information comprises the residual motion vector, i.e. the difference between the actual motion vector of the block to encode and the selected motion vector predictor, and an item of information indicating the selected motion vector predictor, such as for example an encoded value of the index of the selected motion vector predictor.

In the High Efficiency Video Coding (HEVC) currently in the course of standardization, it has been proposed to use a plurality of motion vector predictors as schematically illustrated in FIG. 1: 3 so-called spatial motion vector predictors $V_1$, $V_2$ and $V_3$ taken from blocks situated in the neighbourhood of the block to encode, a median motion vector predictor computed based on the components of the three spatial motion vector predictors $V_1$, $V_2$ and $V_3$ and a temporal motion vector predictor $V_0$ which is the motion vector of the co-located block in a previous image of the sequence (e. g. block of image N−1 located at the same spatial position as block 'Being coded' of image N). Currently in HEVC the 3 spatial motion vector predictors are taken from the block situated to the left of the block to encode ($V_3$), the block situated above ($V_2$) and from one of the blocks situated at the respective corners of the block to encode, according to a predetermined rule of availability. This motion vector predictor selection scheme is called Advanced Motion Vector Prediction (AMVP). In the example of FIG. 1, the vector $V_1$ of the block situated above left is selected.

Finally, a set of 5 motion vector predictor candidates mixing spatial predictors and temporal predictors is obtained. In order to reduce the overhead of signaling the motion vector predictor in the bitstream, the set of motion vector predictors is reduced by eliminating the duplicated motion vectors, i.e. the motion vectors which have the same value. For example, in the illustration of FIG. 1, $V_1$ and $V_2$ are equal, and $V_0$ and $V_3$ are also equal, so only two of them should be kept as motion vector prediction candidates, for example $V_0$ and $V_1$. In this case, only one bit is necessary to indicate the index of the motion vector predictor to the decoder.

A further reduction of the set of motion vector predictors, based on the values of the predictors, is possible. Once the best motion vector predictor is selected and the motion vector residual is computed, it is possible to further eliminate from the prediction set the candidates which would have not been selected, knowing the motion vector residual and the cost optimization criterion of the encoder. A sufficient reduction of the set of predictors leads to a gain in the signaling overhead, since the indication of the selected motion vector predictor can be encoded using fewer bits. At the limit, the set of candidates can be reduced to 1, for example if all motion vector predictors are equal, and therefore it is not necessary to insert any information relative to the selected motion vector predictor in the bitstream.

To summarize, the encoding of motion vectors by difference with a motion vector predictor, along with the reduction of the number of motion vector predictor candidates leads to a compression gain. However, as explained above, for a given block to encode, the reduction of the number of motion vector predictor candidates is based on the values taken by the motion vector predictors of the set, in particular the values of the motion vectors of the neighbouring blocks and of the motion vector of the co-located block. Also, the decoder needs to be able to apply the same analysis of the set of possible motion vector predictors as the encoder, in order to deduce the amount of bits used for indicating the selected motion vector predictor and to be able to decode the index of the motion vector predictor and finally to decode the motion vector using the motion vector residual received. Referring to the example of FIG. 1, the set of motion vector predictors of the block 'being coded' is reduced by the encoder to $V_0$ and $V_1$, so the index is encoded on 1 single bit. If the block of image N−1 is lost during transmission, the decoder cannot obtain the value of $V_0$, and therefore cannot find out that $V_0$ and $V_3$ are equal. Therefore, the decoder cannot find how many bits were used for encoding the index of the motion vector predictor for the block 'being coded', and consequently the decoder cannot correctly parse the data for the slice because it cannot find where the index encoding stops and the encoding of video data starts.

Therefore, the fact that the number of bits used for signaling the motion vectors predictors depends of the values taken by the motion vector predictors makes the method very vulnerable to transmission errors, when the bitstream is transmitted to a decoder on a lossy communication network. Indeed, the method requires the knowledge of the values of the motion vector predictors to parse the bitstream correctly at the decoder. In case of packet losses, when some motion vector residual values are lost, it is impossible for the decoder to determine how many bits were used to encode an index representing the motion vector predictor has been encoded, and so it is impossible to parse the bitstream correctly. Such an error may propagate causing the decoder's de-synchronization until a following synchronization image, encoded without prediction, is received by the decoder.

It would be desirable to at least be able to parse an encoded bitstream at a decoder even in case of packet losses, so that some re-synchronization or error concealment can be subsequently applied.

It was proposed, in the document JCTVC-C166r1, 'TE11: Study on motion vector coding (experiment 3.3a and 3.3c)' by K. Sato, published at the $3^{rd}$ meeting of the Joint Collaborative Team on Video Coding (JTC-VC) of Guangzhou, 7-15 of Oct. 2010, to use only the spatial motion vector predictors coming from the same slice in the predictor set. This solution solves the problem of parsing at the decoder in case of slice losses. However, the coding efficiency is significantly decreased, since the temporal motion vector predictor is no longer used. Therefore, this solution is not satisfactory in terms of compression performance.

Document JCTVC-C257, 'On motion vector competition', by Yeping Su and Andrew Segall, published at the $3^{rd}$ meeting of the Joint Collaborative Team on Video Coding (JTC-VC) of Guangzhou, 7-15 of Oct. 2010, proposes signaling separately if the selected motion vector predictor is the temporal predictor, i.e. the motion vector of the co-located block, and, if the selected motion vector predictor is not the temporal predictor, using the motion vector predictor set reduction scheme described above to indicate the selected candidate. However, this proposal fails to achieve the result of ensuring correct parsing at the decoder in some cases. Indeed, it assumes that the spatial motion vector predictors are necessarily known at the decoder. However, a motion vector of a neighbouring block of the block to encode may itself be predicted from a temporal co-located block which has been lost during transmission. In that case, the value of a motion vector of the set of predictors is unknown, and the parsing problem at the decoder occurs.

It is desirable to address one or more of the drawbacks in the related art. Further, it is desirable to provide a method allowing correct parsing at the decoder even in the case of a bitstream corrupted by transmission losses while keeping good compression efficiency.

SUMMARY OF THE INVENTION

In accordance with one aspect of the present invention there is provided a method of encoding a sequence of digital images into a plurality of encoding units forming a bitstream. At least one portion of an image, belonging to a current encoding unit, is encoded by motion compensation with respect to a reference image portion indicated by an item of motion information. The method comprises selecting a motion information predictor from among a set of motion information predictors and encoding the item of motion information with respect to the motion information predictor. The set of motion information predictors is permitted to include at least one temporal motion information predictor associated with an image portion of a previous image of the sequence but is not permitted to include any spatial motion information predictor that is unobtainable from encoded data of the current encoding unit.

For example, the set of motion information predictors is not permitted to include a spatial motion information predictor that is itself encoded with respect to such a temporal motion information predictor. Such a spatial motion information predictor is one example of a spatial motion information predictor that is unobtainable from encoded data of the current encoding unit.

Another example of a spatial motion information predictor that is unobtainable from encoded data of the current encoding unit is a spatial motion information predictor that, although not itself encoded with respect to a temporal motion information predictor, belongs to a different (preceding) encoding unit from the current encoding unit. Depending on how the encoding units (slices) are divided up within an image, it is possible that some image portions neighbouring the image portion being encoded may belong to an encoding unit different from the current encoding unit. In this case, too, it is effective to exclude the spatial motion information predictors belonging to the different encoding unit from the set of spatial motion information predictors for the image portion being encoded.

Advantageously, the encoding method of the invention provides for systematically obtaining the spatial motion information predictors used for the selection of a motion information predictor for a current unit to encode, at the encoder and at the decoder, since only encoded data of the current encoded unit is necessary. Therefore, no parsing error occurs at a decoder, even in case of transmission errors. Moreover, the compression efficiency is preserved since the set of motion information predictors is permitted to include also at least one temporal motion information predictor.

According to an embodiment, the invention relates to a method of encoding a sequence of digital images into a plurality of encoding units forming a bitstream, at least one portion of an image being encoded by motion compensation with respect to a reference image portion indicated by an item of motion information, comprising selecting a motion information predictor among a set of motion information predictors and encoding the item of motion information with respect to the motion information predictor. For at least one image portion to encode belonging to a current encoding unit, the encoding method further comprises the steps of:

obtaining a first set of motion information predictors, processing the first set of motion information predictors to obtain a second set of motion information predictors, wherein any motion information predictor of the second set can be obtained from encoded data of the current encoding unit, and selecting a motion information predictor for the image portion to encode among the motion information predictors of the second set of motion information predictors, called spatial motion information predictors, and at least one temporal motion information predictor associated with an image portion belonging to the reference image.

The motion information can be for example represented by motion vectors and the image portion to encode may be for example an image block. Advantageously, the item of motion information (or motion vector) for a current image portion to encode is selected among spatial and temporal motion information predictors, and the set of spatial motion information predictors can be computed at a decoder even in case of transmission losses.

Therefore, the decoder can always parse the bitstream even if some losses occur, without heavily penalizing the compression efficiency since a variety of motion information predictors, i.e. spatial motion information predictors and at least one temporal motion information predictor are used to predict the current motion vector to encode. Further, an optimized or reduced set of spatial motion information predictors can be used, since it is ensured that the motion information predictors of the set can systematically be retrieved by a decoder.

According to an embodiment, the encoding method further comprises a step of inserting in the bitstream an item of information indicating whether the motion information predictor is a temporal motion information predictor or a spatial motion information predictor selected from the second set of motion information predictors.

Here, a spatial motion information predictor is a motion information predictor that can be entirely computed from encoded data of the current encoding image, whereas a temporal motion information predictor is a motion information predictor that depends on data, such a motion vector, coming from another slice, in particular a slice of a reference image. Advantageously, such an indication in the bitstream allows a decoder to eliminate subsequently any motion vector encoded by temporal prediction from a set of motion vector predictors, and therefore to avoid parsing errors.

According to another aspect of the invention there is provided a device for encoding a sequence of digital images into a plurality of encoding units forming a bitstream, the device comprising means for encoding at least one portion of an image, belonging to a current encoding unit, by motion compensation with respect to a reference image portion indicated by an item of motion information, means for selecting a motion information predictor from among a set of motion information predictors and means for encoding the item of motion information with respect to the motion information predictor. The set of motion information predictors is permitted to include at least one temporal motion information predictor associated with an image portion of a previous image of the sequence but is not permitted to include any spatial motion information predictor that is unobtainable from encoded data of the current encoding unit.

According to another aspect, the invention relates to a device for encoding a sequence of digital images into a plurality of encoding units forming a bitstream, at least one portion of an image being encoded by motion compensation with respect to a reference image portion indicated by an item of motion information. The device comprises means for selecting a motion information predictor among a set of motion information predictors and means for encoding the item of motion information with respect to the motion information predictor. The device comprises, to apply to at least one image portion to encode belonging to a current encoding unit:

means for obtaining a first set of motion information predictors, means for processing the first set of motion information predictors to obtain a second set of motion information predictors, wherein any motion information predictor of the second set can be obtained from encoded data of the current encoding unit, and means for selecting a motion information predictor for the image portion to encode among the motion information predictors of the second set of motion information predictors, called spatial motion information predictors, and at least one temporal motion information predictor associated with an image portion belonging to the reference image.

According to yet another aspect, the invention also relates to an information storage means that can be read by a computer or a microprocessor, this storage means being removable, and storing instructions of a computer program for the implementation of the method for encoding a sequence of digital images as briefly described above.

According to yet another aspect, the invention also relates to a computer program product that can be loaded into a programmable apparatus, comprising sequences of instructions for implementing a method for encoding a sequence of digital images as briefly described above, when the program is loaded into and executed by the programmable apparatus. Such a computer program may be transitory or non transitory. In an implementation, the computer program can be stored on a non-transitory computer-readable carrier medium.

The particular characteristics and advantages of the device for encoding a sequence of digital images, of the storage means and of the computer program product being similar to those of the digital video signal encoding method, they are not repeated here.

According to yet another aspect, the invention relates to a method of encoding a sequence of digital images into a plurality of encoding units forming a bitstream, at least one portion of an image being encoded by motion compensation with respect to a reference image portion indicated by an item of motion information, comprising selecting a motion information predictor among a set of motion information predictors and encoding the item of motion information with respect to the motion information predictor. For at least one image portion to encode belonging to a current encoding unit, the encoding method further comprises the steps of:

obtaining a first set of motion information predictors, processing the first set of motion information predictors to obtain a second set of motion information predictors, wherein any motion information predictor of the second set can be obtained from encoded data of the current encoding unit, and using the second set of motion information predictors in the selection of a motion information predictor for the image portion to encode.

The motion information can be for example represented by motion vectors, and an image portion to encode can be for example an image block.

Advantageously, the second set of motion information predictors contains spatial motion vector predictors that can be computed at a decoder even in case of transmission losses. Therefore, the decoder can always parse the bitstream even if some losses occur.

Moreover, a reduced set of spatial motion information predictors can be used, since it is ensured that the motion information predictors of the set can systematically be retrieved by a decoder.

According to yet another aspect, the invention relates to a method of encoding a sequence of digital images into a plurality of encoding units forming a bitstream, at least one portion of an image being encoded by motion compensation with respect to a reference image portion indicated by an item of motion information, comprising selecting a motion information predictor among a set of motion information predictors and encoding the item of motion information with respect to the motion information predictor. For at least one image portion to encode belonging to a current encoding unit, the encoding method further comprises the steps of:

obtaining a first set of motion information predictors, processing the first set of motion information predictors to obtain a second set of motion information predictors, the processing comprising:

for each given motion information predictor of said first set, verifying whether the given motion information predictor is encoded in the bitstream depending on a motion information predictor of the current encoding unit, and in case of negative verification, generating a replacement motion information predictor, wherein the second motion information predictor can be obtained from encoded data of the current encoding unit and inserting the replacement motion information predictor into the second set of motion information predictors, and using the second set of motion information predictors in the selection of a motion information predictor for the image portion to encode.

The second set so generated contains the same number of motion information predictors as the first set, but all of the motion information predictors of the second set can be obtained from encoded data of the current encoded unit. Consequently, the second set contains only motion information predictors that can be computed at a decoder even in case of transmission losses. Therefore, the decoder can always parse the bitstream even if some losses occur.

According to another aspect of the present invention there is provided a method of decoding a bitstream comprising an encoded sequence of digital images, the bitstream comprising a plurality of encoding units, at least one portion of an image being encoded by motion compensation with respect to a reference image portion indicated by an item of motion information, the item of motion information being encoded with respect to a motion information predictor selected among a set of motion information predictors. The set of motion information predictors used for encoding is permitted to include at least one temporal motion information predictor associated with an image portion of a previous image of the sequence but is not permitted to include any spatial motion information predictor that is unobtainable from encoded data of the current encoding unit. For at least one image portion to decode, belonging to a current encoding unit, the decoding method further comprises the steps of:

obtaining an item of information indicating whether the image portion to decode has an associated temporal motion information predictor or an associated spatial motion information predictor, and if the image portion to decode has an associated spatial motion information predictor:

obtaining a set of spatial motion information predictors which is not permitted to include any spatial motion information predictor that is unobtainable from encoded data of the current encoding unit, and decoding an item of information representative of the spatial motion information predictor based upon the set of motion information predictors obtained.

For example, the set of motion information predictors obtained by the decoder is not permitted to include a spatial motion information predictor that is itself encoded with respect to such a temporal motion information predictor. Such a spatial motion information predictor is one example of a spatial motion information predictor that is unobtainable from encoded data of the current encoding unit.

Another example of a spatial motion information predictor that is unobtainable from encoded data of the current encoding unit is a spatial motion information predictor that, although not itself encoded with respect to a temporal motion information predictor, belongs to a different (preceding) encoding unit from the current encoding unit. Depending on how the encoding units (slices) are divided up within an image, it is possible that some image portions neighbouring the image portion being encoded may belong to an encoding unit different from the current encoding unit. In this case, too, it is effective to exclude the spatial motion information predictors belonging to the different encoding unit from the set of spatial motion information predictors obtained for the image portion being decoded. According to yet another aspect, the invention also relates to a method for decoding a bitstream comprising an encoded sequence of digital images, the bitstream comprising a plurality of encoding units, at least one portion of an image being encoded by motion compensation with respect to a reference image portion indicated by an item of motion information, the item of motion information being encoded with respect to a motion information predictor selected among a set of motion information predictors. For at least one image portion to decode belonging to a the current encoding unit, the method further comprises the steps of:

obtaining an item of information indicating whether the image portion to decode has an associated temporal motion information predictor or an associated spatial motion information predictor, and if the image portion to decode has an associated spatial motion information predictor:

obtaining a first set of motion information predictors, processing the first set of motion information predictors to obtain a second set of motion information predictors, wherein any motion information predictor of the second set can be obtained from encoded data of the current encoding unit, and decoding an item of information representative of the spatial motion information predictor based upon the second set of motion information predictors obtained.

A temporal motion information predictor is a motion information predictor depending on an encoding unit different from the current encoding unit being processed, whereas, in the meaning of the invention, a spatial motion information predictor can be entirely computed from encoded data of the current encoding unit. Advantageously, the decoder can systematically parse the bitstream to decode an item of information, such as an index, representative of the motion information predictor of the current unit to decode.

According to yet another aspect, the invention also relates to a device for decoding a bitstream comprising an encoded sequence of digital images, the bitstream comprising a plurality of encoding units, at least one portion of an image being encoded by motion compensation with respect to a reference image portion indicated by an item of motion information, the item of motion information being encoded with respect to a motion information predictor selected among a set of motion information predictors. The device comprises, to apply to at least one image portion to decode belonging to a current encoding unit:

means for obtaining an item of information indicating whether the image portion has an associated temporal motion information predictor or an associated spatial motion information predictor, and if the image portion to decode has an associated spatial motion information predictor:

means for obtaining a first set of motion information predictors, means for processing the first set of motion information predictors to obtain a second set of motion information predictors, wherein any motion information predictor of the second set can be obtained from encoded data of the current encoding unit, and means for decoding an item of information representative of the spatial motion information predictor based upon the second set of motion information predictors obtained.

According to a yet another aspect, the invention also relates to an information storage means that can be read by a computer or a microprocessor, this storage means being removable, and storing instructions of a computer program for the implementation of the method for decoding a bitstream as briefly described above.

According to yet another aspect, the invention also relates to a computer program product that can be loaded into a programmable apparatus, comprising sequences of instructions for implementing a method for decoding a bitstream as briefly described above, when the program is loaded into and executed by the programmable apparatus. Such a computer program may be transitory or non transitory. In an implementation, the computer program can be stored on a non-transitory computer-readable carrier medium.

The particular characteristics and advantages of the device for decoding a bitstream, of the storage means and of the computer program product being similar to those of the decoding method, they are not repeated here.

DETAILED DESCRIPTION OF THE EMBODIMENTS

Figure 1:
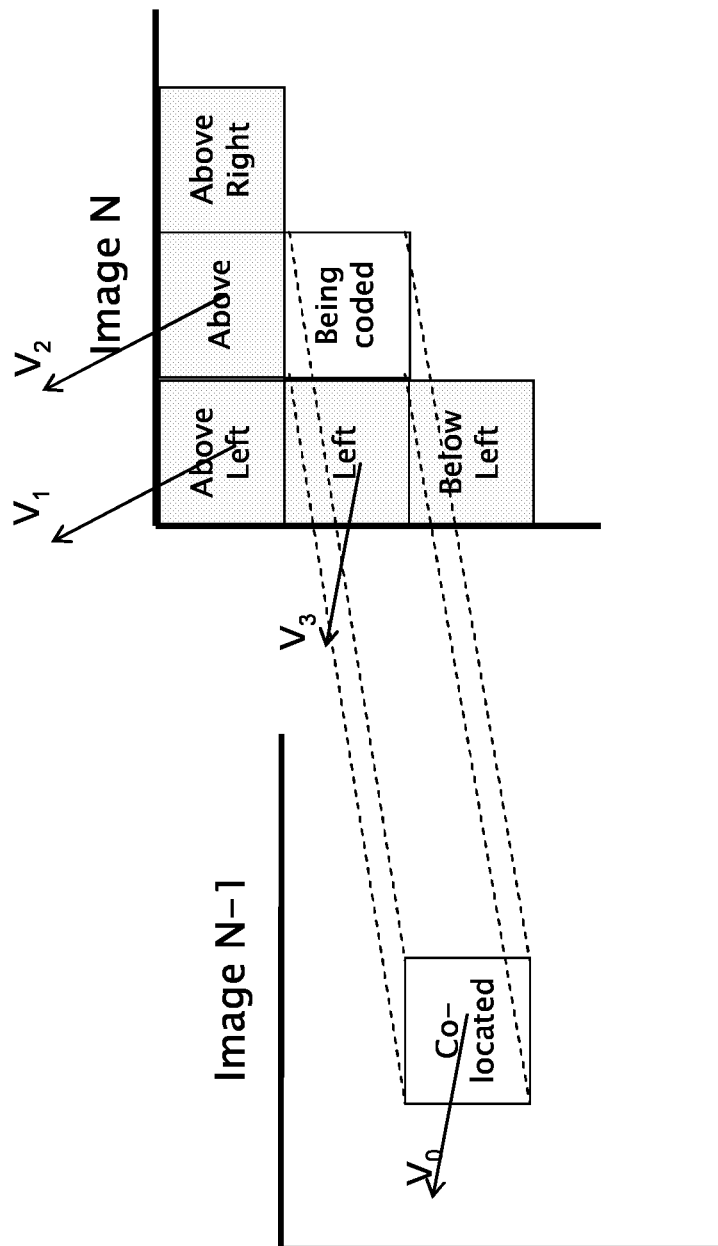
FIG. 1, already described, illustrates schematically a set of motion vector predictors used in a motion vector prediction scheme.
Figure 2:
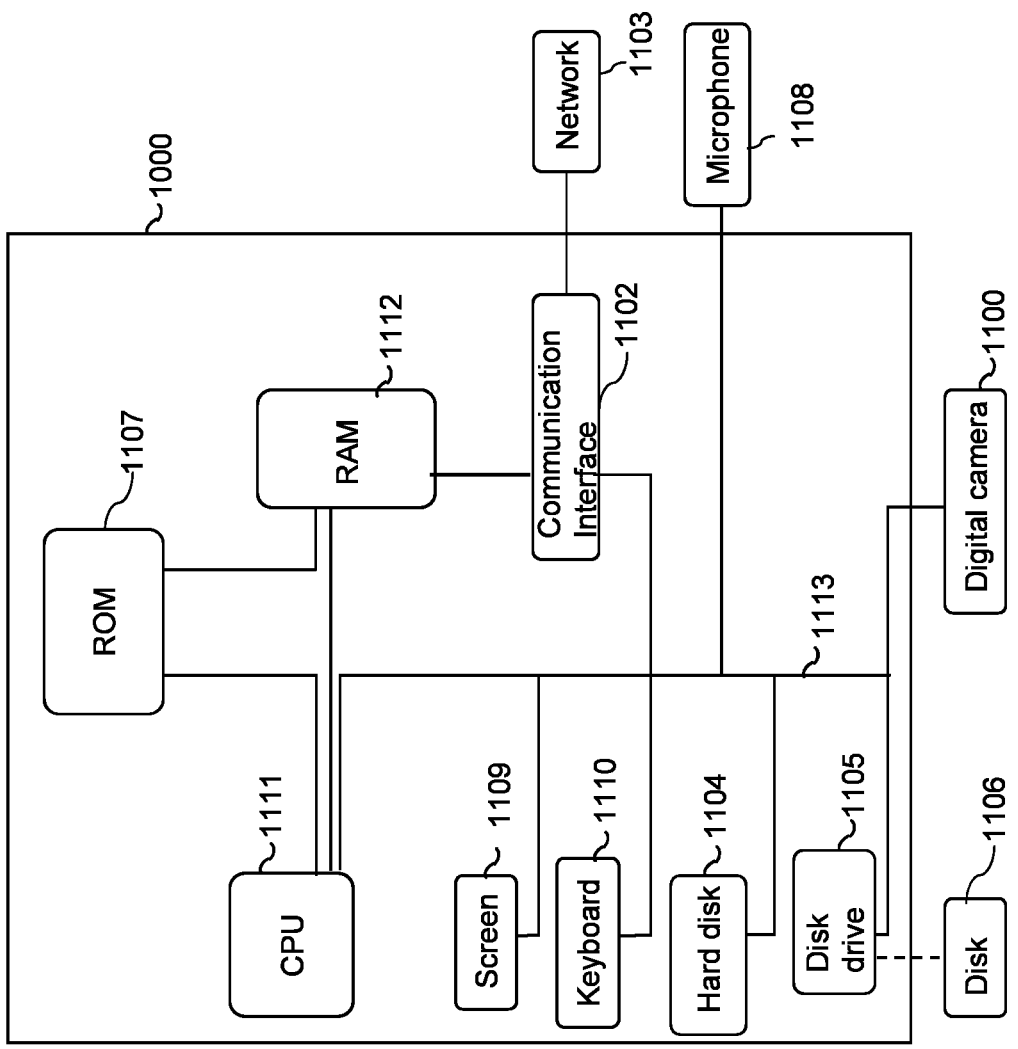
FIG. 2 is a diagram of a processing device adapted to implement an embodiment of the present invention.

FIG. 2 illustrates a diagram of a processing device 1000 adapted to implement one embodiment of the present invention. The apparatus 1000 is for example a micro-computer, a workstation or a light portable device.

The apparatus 1000 comprises a communication bus 1113 to which there are preferably connected:

a central processing unit 1111, such as a microprocessor, denoted CPU;

a read only memory 1107 able to contain computer programs for implementing the invention, denoted ROM;

a random access memory 1112, denoted RAM, able to contain the executable code of the method of the invention as well as the registers adapted to record variables and parameters necessary for implementing the method of encoding a sequence of digital images; and a communication interface 1102 connected to a communication network 1103 over which digital data to be processed are transmitted.

Optionally, the apparatus 1000 may also have the following components:

a data storage means 1104 such as a hard disk, able to contain the programs implementing the invention and data used or produced during the implementation of the invention;

a disk drive 1105 for a disk 1106, the disk drive being adapted to read data from the disk 1106 or to write data onto the disk;

a screen 1109 for displaying data and/or serving as a graphical interface with the user, by means of a keyboard 1110 or any other pointing means.

The apparatus 1000 can be connected to various peripherals, such as for example a digital camera 1100 or a microphone 1108, each being connected to an input/output card (not shown) so as to supply multimedia data to the apparatus 1000.

The communication bus affords communication and interoperability between the various elements included in the apparatus 1000 or connected to it. The representation of the bus is not limiting and in particular the central processing unit is able to communicate instructions to any element of the apparatus 1000 directly or by means of another element of the apparatus 1000.

The disk 1106 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 1107, on the hard disk 1104 or on a removable digital medium such as for example a disk 1106 as described previously. According to a variant, the executable code of the programs can be received by means of the communication network, via the interface 1102, in order to be stored in one of the storage means of the apparatus 1000 before being executed, such as the hard disk 1104.

The central processing unit 1111 is adapted to control and direct the execution of the instructions or portions of software code of the program or programs according to the invention, instructions that are stored in one of the aforementioned storage means. On powering up, the program or programs that are stored in a non-volatile memory, for example on the hard disk 1104 or in the read only memory 1107, are transferred into the random access memory 1112, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 3:
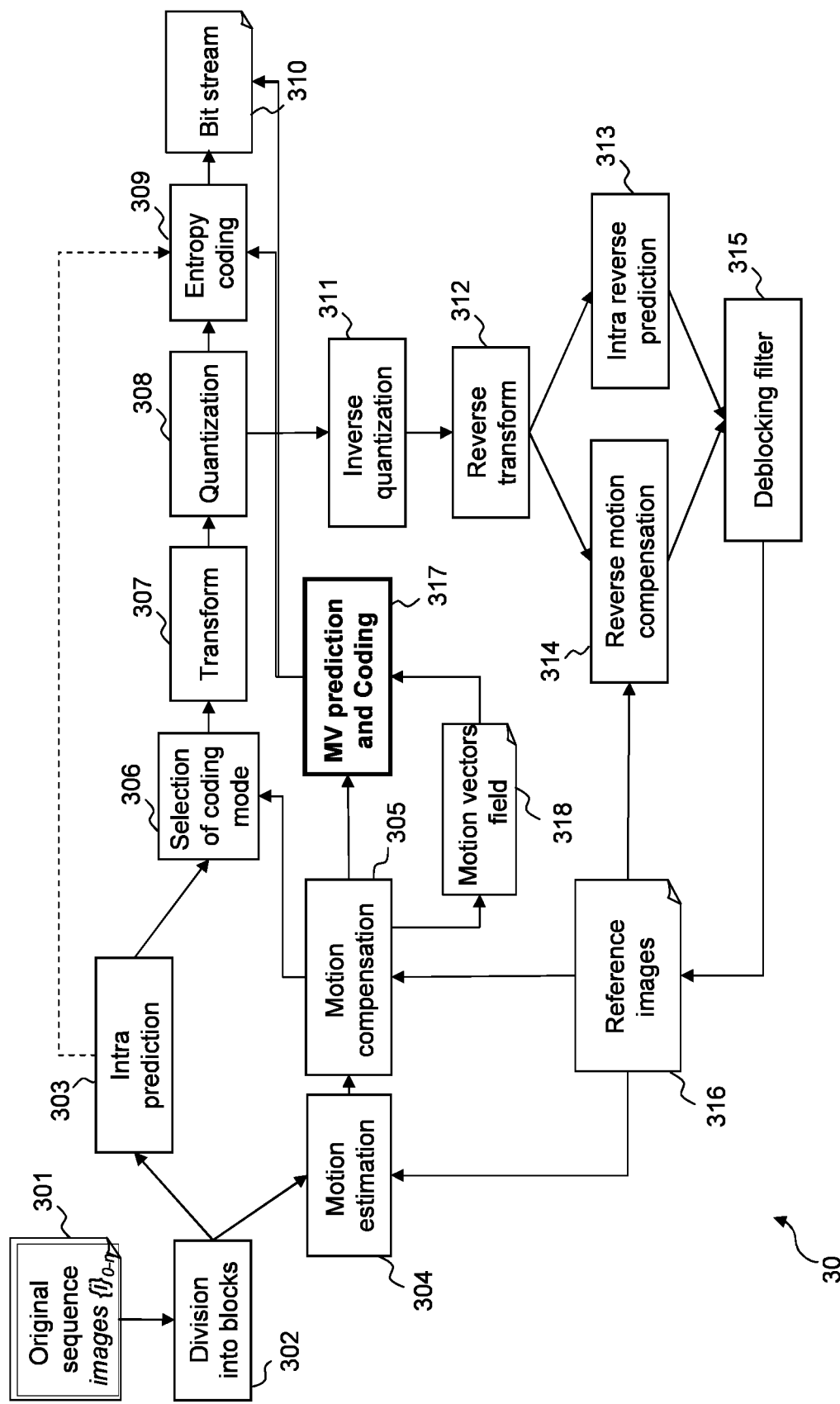
FIG. 3 is a block diagram of an encoder according to an embodiment of the invention.

FIG. 3 illustrates a block diagram of an encoder according to an embodiment of the invention. The encoder is represented by connected modules, each module being adapted to implement, for example in the form of programming instructions to be executed by the CPU 1111 of device 1000, a corresponding step of a method implementing an embodiment of the invention.

An original sequence of digital images $i_0$ to $i_n$ 301 is received as an input by the encoder 30. Each digital image is represented by a set of samples, known as pixels.

The input digital images are divided into blocks (302), which blocks are image portions. A coding mode is selected (306) for each input block. There are two families of coding modes, spatial prediction coding or Intra coding, and temporal prediction (Inter) coding. The possible coding modes are tested.

Module 303 implements Intra prediction, in which the given block to encode is predicted by a predictor computed from pixels in its neighbourhood. An indication of the Intra predictor selected and the difference between the given block and its predictor is encoded if the Intra prediction is selected.

Temporal prediction is implemented by modules 304 and 305. Firstly a reference image among a possible set of reference images 316 is selected, and a portion of the reference image, also called reference area, which is the closest area to the given block to encode, is selected by the motion estimation module 304. The difference between the selected reference area and the given block, also called residual block, is computed by the motion compensation module 305. The selected reference area is indicated by a motion vector. Information relating to the motion vector and the residual block is encoded if the Inter prediction is selected. To further reduce the bitrate, the motion vector is encoded by difference with respect to a motion vector predictor. A set of motion vector predictors, also called motion information predictors, is obtained from the motion vectors field 318 by a motion vector prediction and coding module 317.

Figure 4:
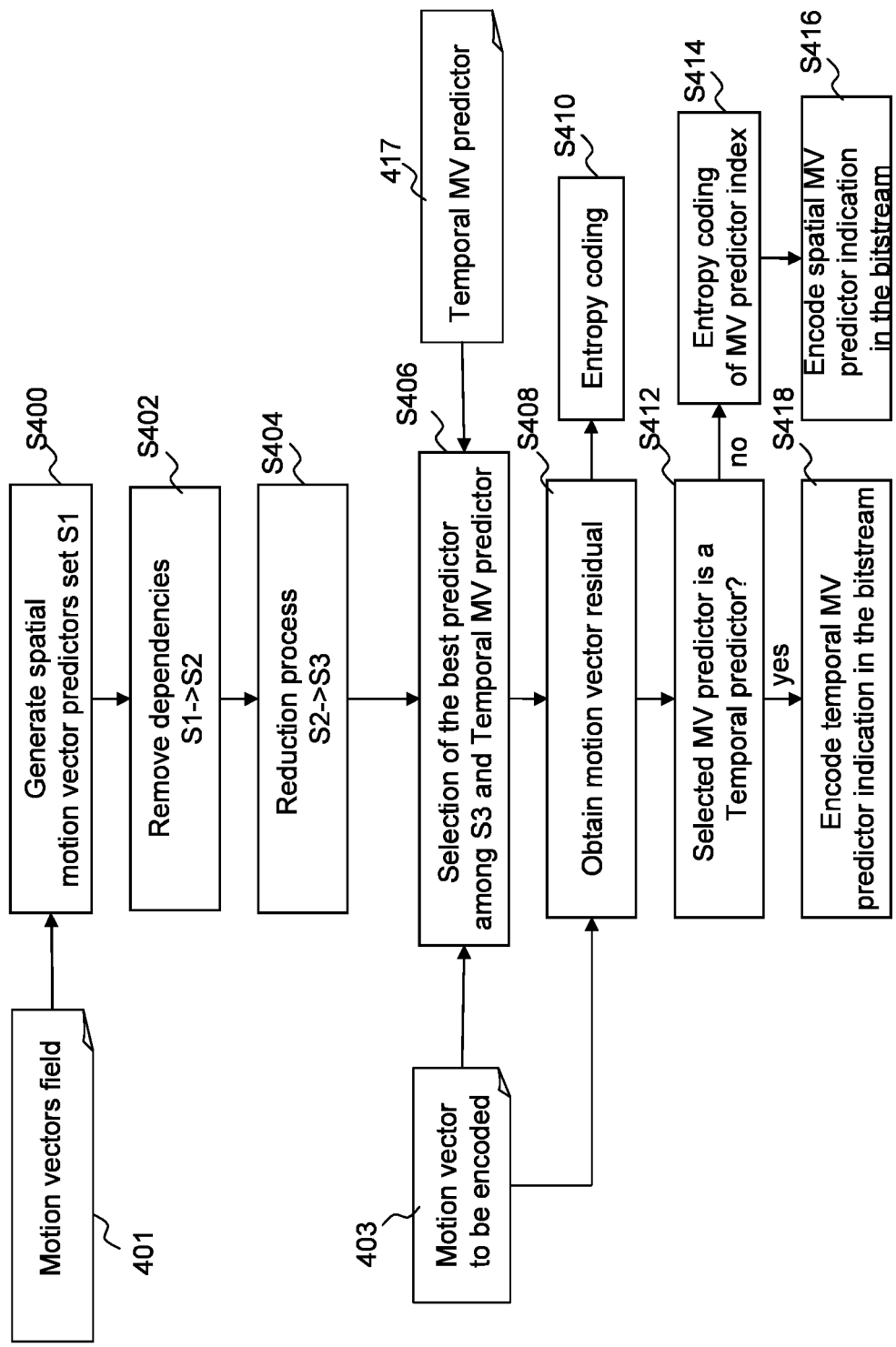
FIG. 4 details an embodiment of the method of encoding a set of motion vector predictors.

Advantageously, the motion vector prediction and coding module is implemented as detailed hereafter with respect to FIG. 4. In order to preserve the compression efficiency, the motion vector of a current block is encoded with respect to a motion vector predictor which is selected among spatial motion vector predictors and a temporal motion vector predictor, which is the motion vector of the co-located block in a reference image. Alternatively, a selection among several temporal motion vector predictors can be applied.

To preserve the compression efficiency and to encode the motion vector predictors using less bits, a reduction process is applied. Advantageously, the reduction process is applied only on a set of motion vectors which have no temporal dependencies, and more generally no dependencies on other slices, and which can be computed by a decoder even in case of losses or corruption. Therefore, the bitstream can be parsed even in the case of losses or corruption. An item of information indicating for a given block whether its motion vector is encoded with respect to a temporal motion predictor is also inserted in the bitstream, for example in the header of a coding unit, a coding unit being either a slice or the entire sequence or a group of images of the sequence.

The encoder 30 further comprises a module of selection of the coding mode 306, which uses an encoding cost criterion, such as a rate-distortion criterion, to determine which is the best mode between the spatial prediction mode and the temporal prediction mode. A transform 307 is applied to the residual block, the transformed data obtained is then quantized by module 308 and entropy encoded by module 309. Finally, the encoded residual block of the current block to encode is inserted in the bitstream 310, along with the information relative to the predictor used. For the blocks encoded in 'SKIP' mode, only a reference to the predictor is encoded in the bitstream, without residual.

The encoder 30 further performs the decoding of the encoded image in order to produce a reference image for the motion estimation of the subsequent images. The module 311 performs inverse quantization of the quantized data, followed by an inverse transform 312. The reverse motion prediction module 313 uses the prediction information to determine which predictor to use for a given block and the reverse motion compensation 314 actually adds the residual obtained by module 312 to the reference area obtained from the set of reference images 316. Optionally, a deblocking filter 315 is applied to remove the blocking effects and enhance the visual quality of the decoded image. The same deblocking filter is applied at the decoder, so that, if there is no transmission loss, the encoder and the decoder apply the same processing.

FIG. 4 details an embodiment of the method of encoding a set of motion vector predictors. All the steps of the algorithm represented in FIG. 4 can be implemented in software and executed by the central processing unit 1111 of the device 1000.

The processing of FIG. 4 is applied to an input block to encode or image portion, belonging to a current slice, for which a motion vector to be encoded 403 has already been determined by motion estimation. An image of the sequence of digital images may be composed of a single slice, or may be composed of several slices.

A motion vectors field 401 comprising the motion vectors already computed for the current image being encoded and for previously encoded reference images is also provided as an input.

In a first step S400, a first set of spatial motion vector predictors S1, also called set of motion information predictors, is generated.

This set contains a predetermined number of motion vector predictors, such as for example the motion vectors of the blocks in the neighbourhood of the current block.

Figure 5:
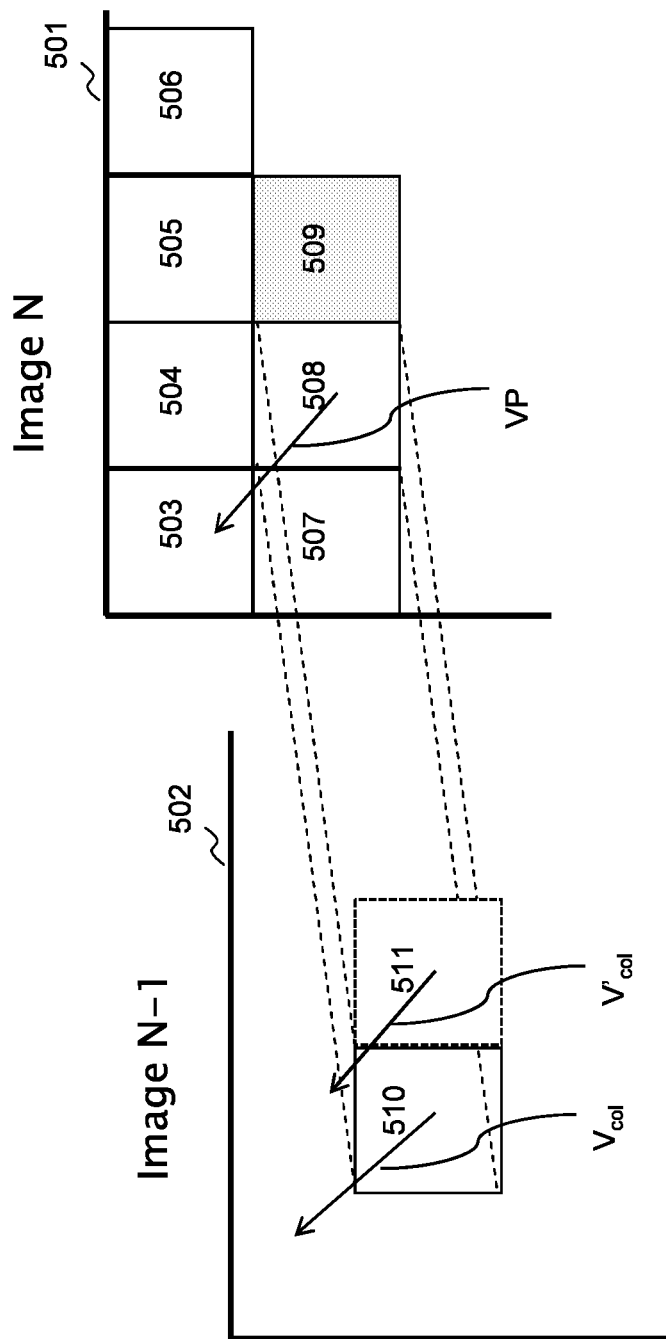
FIG. 5 represents schematically a set of blocks to encode.

In the example of FIG. 5, the input block to encode is block 509 of image 501. The first set of spatial motion vector predictors may include for example the motion vectors of blocks 504, 505, 506 and 508. However, the motion vectors of blocks 503 and 507 can also be included.

The set S1 comprises motion vectors which have already been encoded, and can be retrieved by a decoder if no loss occurs. However, some of the motion vectors of S1 may have been encoded using temporal dependencies or dependencies on other slices. Taking the example of FIG. 5, the motion vector VP of block 508 has been encoded using the motion vector predictor $V_{col}$ which is the motion vector of the co-located block 510 in the previous image 502, therefore the motion vector VP of 508 has a temporal dependency. The motion vector VP is included is S1. In case of loss of the co-located slice of image 502, the decoder would not be able to retrieve the value of motion vector VP of block 508, since the value of motion vector $V_{col}$ of 510 would not be recovered.

Step S400 is followed by step S402 in which the set of motion vector predictors S1 is processed to obtain a set of motion vector predictors S2 which has no dependencies on slices other than the current slice. The processing of step S402 has the effect of cutting dependencies on other slices, that is to say the dependency on a co-located slice of another image of the sequence (temporal dependency) or the dependency on another slice of the same image in the case where an image is composed of several slices. For example, motion vector VP of block 508 is replaced by a new motion vector VP', which can be computed by a decoder even in case of losses. Several techniques for the removal of dependencies will be described hereafter with respect to FIGS. 6 and 7.

The set of spatial motion vector predictors S2 is then processed by a reduction process S404 to obtain a reduced set of spatial motion vector predictors S3.

The reduction process applied in step S404 analyses the values of the motion vector predictors of the set S2, and eliminates duplicates, to produce a reduced set of spatial motion vector predictors S3. A selection of the best predictor for the motion vector to be encoded 403 among the predictors of set S3 and the temporal motion vector predictor 417 (also represented in FIG. 5 by the motion vector $V'_{col}$ of block 511, which is the co-located block of block 509 in image 502) is applied in step S406, typically using a rate-distortion criterion. A motion vector predictor index is then obtained, and a motion vector residual is obtained in step S408 by computing the difference between the motion vector to be encoded 403 and the selected motion vector predictor.

The motion vector residual is entropy encoded in step S410.

Further, a different processing is applied according to whether the selected motion vector predictor is a temporal predictor 417 or one of the spatial motion vector predictors of set S3 (test S412).

If the selected motion predictor is not the temporal motion vector 417 (answer 'no' to test S412), then the index of the selected motion vector predictor is entropy encoded (S414) and optionally, an indication of the selection of a spatial motion vector predictor is inserted in the bitstream. For example, such an indication could be inserted as a binary flag taking a predetermined value (FLAG=0 for the SPATIAL case). Such a binary flag can be inserted (S416) in the slice header, relatively to the current block to encode. In this case, the number of bits used for the encoding of the index of the motion vector predictor is dependent on the number of predictors in the reduced set of spatial motion vector predictors S3.

If the selected motion vector predictor is the temporal motion vector 417, answer 'yes' to test S412, then an indication of the use of the temporal motion vector is inserted in the bitstream (S418). For example, such an indication could be inserted as a binary flag taking a predetermined value (FLAG=1 for the TEMPORAL case). Such a binary flag can be inserted in the slice header, relatively to the current block to encode.

Further, during encoding, such an indication can be stored in memory in association with the motion vector of the current block in the motion vectors field 401, so that the indication of the encoding with respect to a temporal predictor can be easily retrieved for the subsequent processing of the following blocks.

In this embodiment, only one temporal motion vector predictor is envisaged, and therefore the simple indication via a binary flag of the selection of the temporal prediction is sufficient for a decoder to retrieve the motion vector predictor selected. However, in an alternative embodiment, if several temporal predictors were considered, the indication of the selection of the temporal prediction should be followed by a value indicating the selected temporal motion vector predictor, typically an encoded index value. It is important to note that the encoding of index of temporal motion vectors should be an encoding that allows systematic parsing at the decoder, typically an encoding without applying a reduction process.

Figure 6:
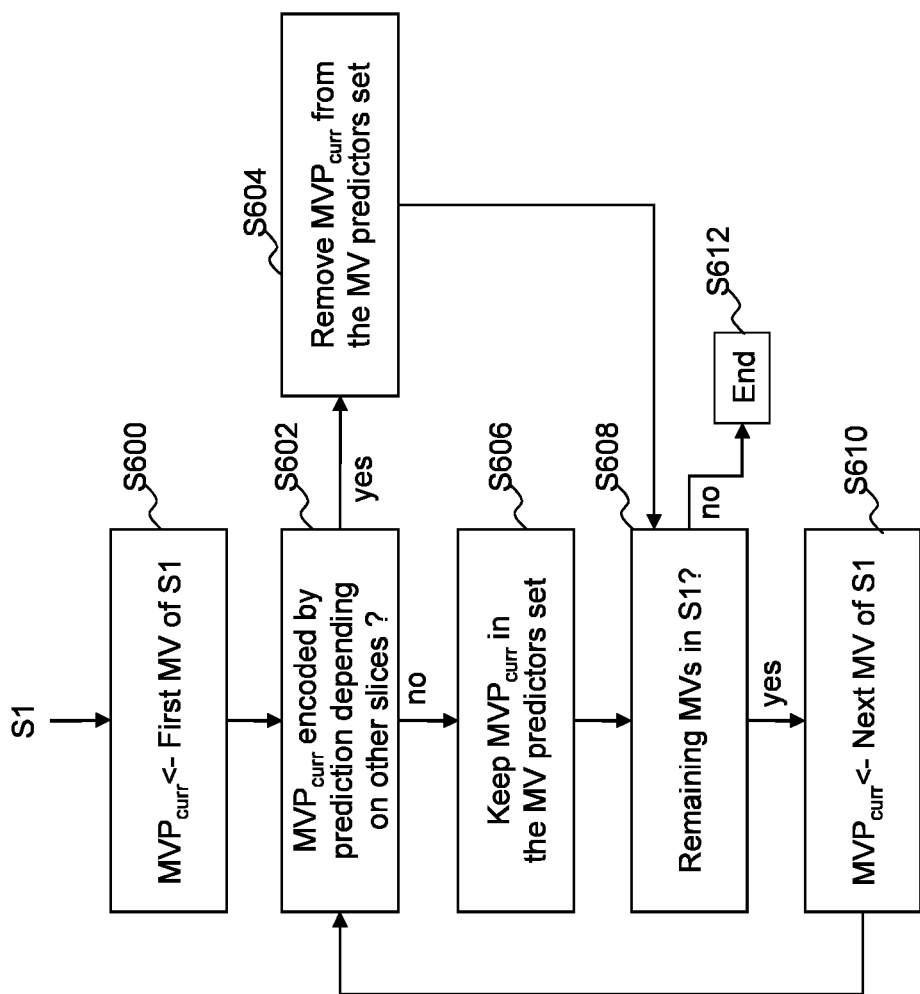
FIG. 6 illustrates a first embodiment of the step of removal of dependencies.

FIG. 6 illustrates a first example of the step of removal of dependencies S402 of FIG. 4. All the steps of the algorithm represented in FIG. 6 can be implemented in software and executed by the central processing unit 1111 of the device 1000.

The set S1 of spatial motion vector predictors for a current block is provided as an input.

The first motion vector (MV) of S1 is selected as the current motion vector predictor to process $MVP_{curr}$ in step S600.

Next, in step S602, it is determined whether $MVP_{curr}$ has been encoded using a motion vector predictor dependent on a slice other than the current slice.

In particular, it is first checked whether the motion vector $MVP_{curr}$ has been encoded by temporal prediction. As explained above, an information regarding the temporal vs spatial prediction encoding of each motion vector can be temporarily stored with the motion vector field. Further, it is checked whether the motion vector $MVP_{curr}$ has been encoded by prediction using a motion vector predictor belonging to a slice different from the current slice. In some embodiments of the encoder, a digital image to encode can be divided in a plurality of slices which are encoded in a predetermined order. In case of loss of the previous slice, the decoder would not be able to retrieve the correct value of the motion vector predictor of $MVP_{curr}$.

If it is determined in step S602 that $MVP_{curr}$ has been encoded in dependence upon data which does not belong to the current slice (answer 'yes' to test S602), step S602 is followed by step S604: $MVP_{curr}$ is simply removed (S604) from the set of motion vector predictors S2. Step S604 is followed by step S608 described hereafter.

If $MVP_{curr}$ is encoded by prediction using a spatial motion vector predictor of the current slice (answer 'no' to test S602, step S602 is followed by step S606, so that $MVP_{curr}$ is kept in the set of spatial motion vector predictors S2. For example, $MVP_{curr}$ is copied in set S2.

Step S604 is followed by step S606 which checks whether there is a remaining motion vector to process in S1. In case of negative answer, the algorithm ends (S612).

In case of positive answer to test S608, the next motion vector predictor of S1 is considered as current motion vector predictor $MVP_{curr}$, and the steps S602 to S608 are repeated.

In this embodiment, the set of motion vector predictors S2 is obtained by removing from the set S1 all the motion vector predictors which have been encoded with dependencies on other slices and which may not be correctly retrieved by a decoder in case of losses.

Figure 7:
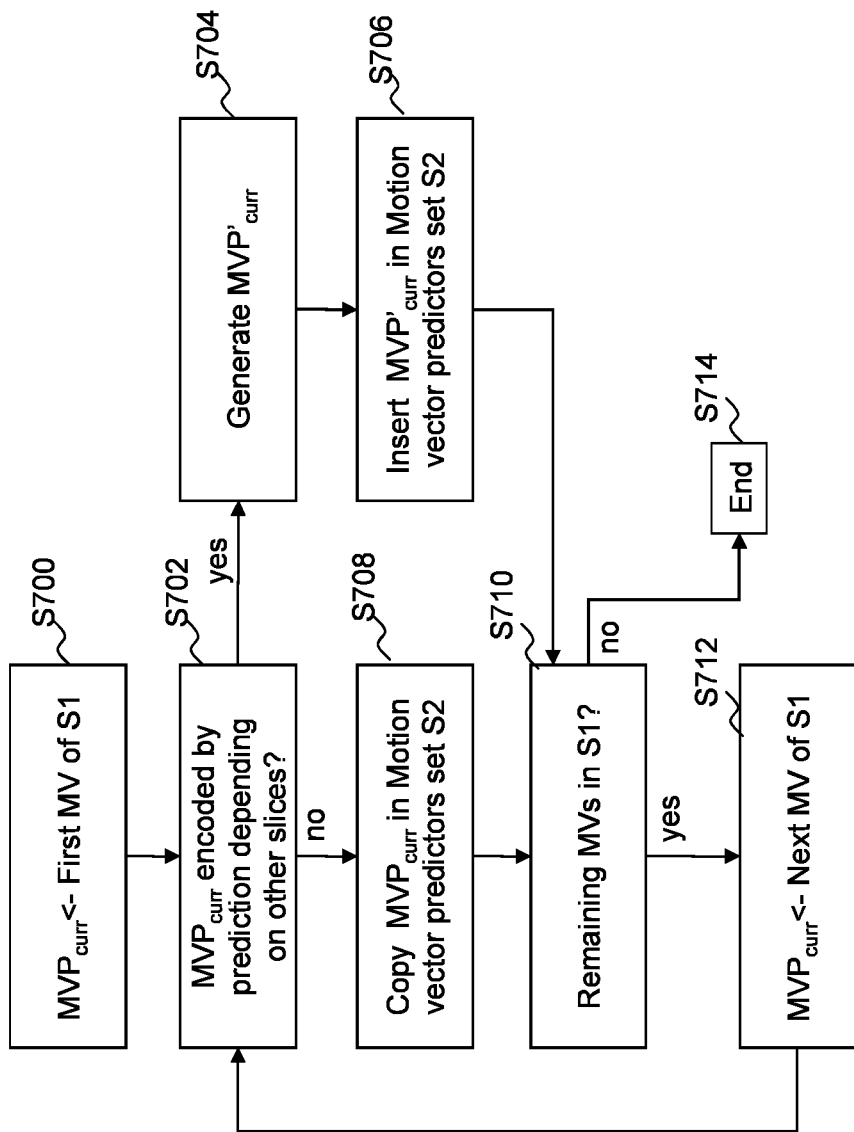
FIG. 7 illustrates a second embodiment of the step of removal of dependencies.

FIG. 7 illustrates a second example of the step of removal of dependencies S402 of FIG. 4. All the steps of the algorithm represented in FIG. 7 can be implemented in software and executed by the central processing unit 1111 of the device 1000.

Similarly to the first example, an initial set of spatial motion vector predictors S1 for the current block is provided. Steps S700 and S702 are similar to steps S600 and S602 of FIG. 6.

If it is determined in step S702 that $MVP_{curr}$ has been encoded in dependence upon data which does not belong to the current slice, step S702 is followed by step S704 of generation of a replacement motion vector predictor, $MVP'_{curr}$. Next, $MVP'_{curr}$ is inserted (S706) in the set of motion vector predictors S2 instead of $MVP_{curr}$. Step S706 is followed by step S710 described hereafter.

The motion vector predictor $MVP'_{curr}$ is generated in such a way that it can be computed at the decoder. $MVP'_{curr}$ is only used as a predictor and is potentially different from the motion vector $MVP_{curr}$ which is actually encoded for motion compensation.

In a first embodiment, $MVP'_{curr}$ is set to the motion vector residual $V_{res}$ encoded for $MVP_{curr}$. Taking the example of FIG. 5, if $MVP_{curr}$ is the motion vector (VP) of block 508, which is encoded using the motion vector $V_{col}$ of the co-located block 510: $MVP_{curr} = V_{col} + V_{res}$, where $V_{res}$ is the motion vector residual actually encoded for block 508. Then, in this embodiment, $MVP'_{curr}$ is set to $V_{res}$.

In a second embodiment, $MVP'_{curr}$ is set to a predetermined vector, for example to the value (0,0).

In a third embodiment, a value which is predetermined or which can be retrieved by the decoder is added to the motion vector residual to obtain $MVP'_{curr}$.

For example, $V_{res}$ is added to another motion vector of S1, if any, which is encoded without dependencies on other slices. A predetermined order of parsing the set of vectors of S1 to find such a suitable motion vector predictor can be applied, both at the encoder and at the decoder. Taking the example of FIG. 5, if $MVP_{curr}$ is the motion vector associated with block 508, the motion vector of block 504 can be used, which is the first motion vector encoded without temporal dependency encountered S1 for example.

Alternatively, a motion vector V to be used for the prediction can be transmitted from the encoder to the decoder in the slice header. Then, $MVP'_{curr} = V_{res} + V$. The motion vector V can be computed as one of the following:
 the average or the weighted average of the motion vectors of the co-located slice of slice to which the current block being processed belong,
 the median value computed from the motion vectors (or a subset of the motion vectors) of the co-located slice,
 the motion vector generated by a global motion estimation algorithm,
 the average or the median value of the selected temporal co-located motion vectors during a first encoding pass. For example, for the current image to encode, all motion vector predictors from the co-located slice are gathered in the first coding pass, their average or median is computed and then used as motion vector V for the prediction in a second encoding pass.

If $MVP_{curr}$ is encoded by prediction using a spatial motion vector predictor of the current slice, $MVP_{curr}$ is kept in the set of spatial motion vector predictors S2. For example, $MVP_{curr}$ is copied (S708) in set S2.

Step S708 is followed by step S710 of checking whether there is a remaining motion vector to process in S1. In case of negative answer, the algorithm ends (S714).

In case of positive answer to test S710, the next motion vector predictor of S1 is considered as current motion vector predictor $MVP_{curr}$, and the steps S702 to S710 are repeated.

In this embodiment, the set of motion vector predictors S2 is obtained by replacing in S1 all the motion vector predictors which have been encoded with dependencies on other slices by generated motion vector predictors that can be computed at the decoder, even in case of losses.

Figure 8:
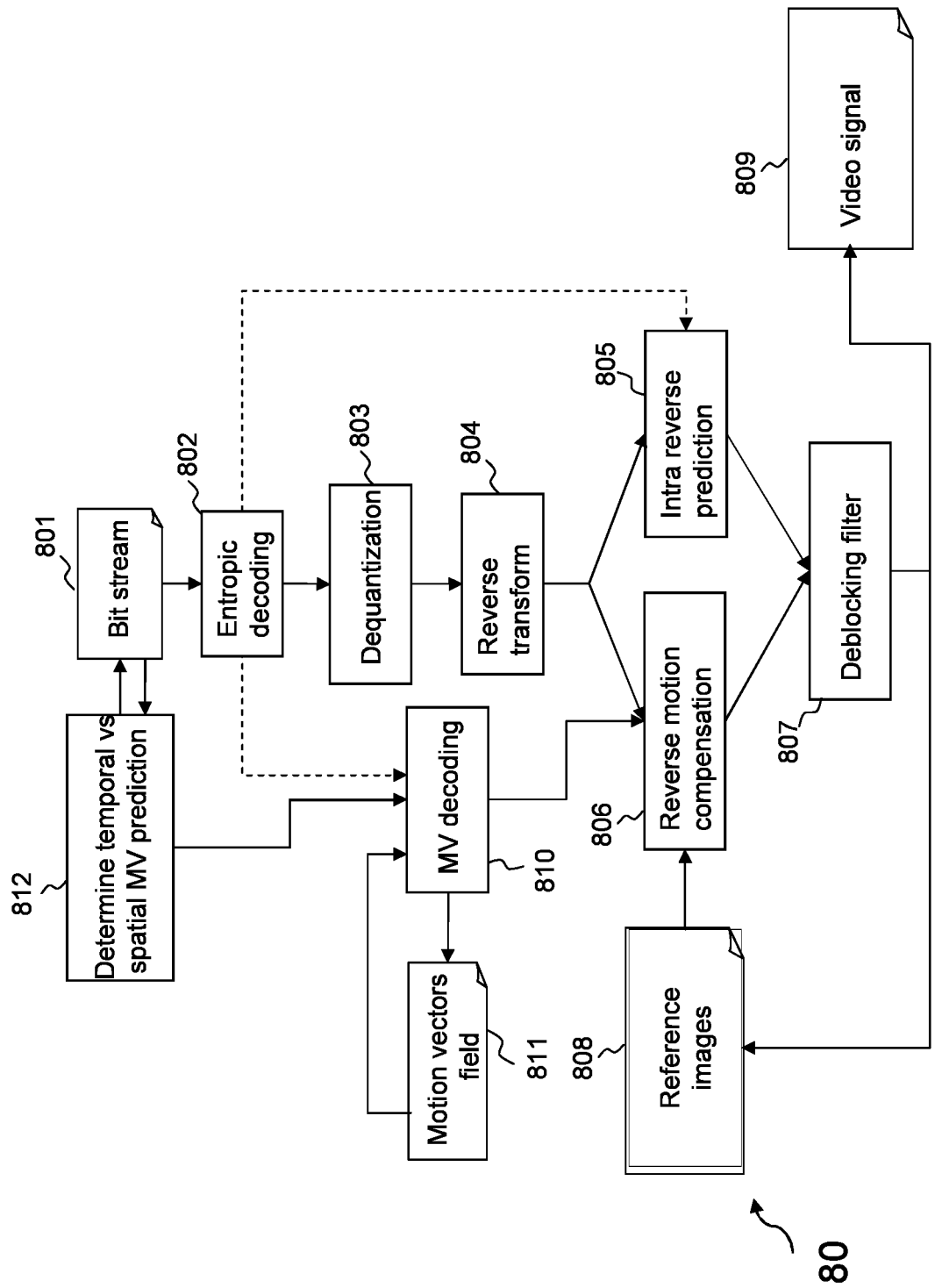
FIG. 8 illustrates a block diagram of a decoder according to an embodiment of the invention.

FIG. 8 illustrates a block diagram of a decoder according to an embodiment of the invention. The decoder is represented by connected modules, each module being adapted to implement, for example in the form of programming instructions to be executed by the CPU 1111 of device 1000, a corresponding step of a method implementing an embodiment of the invention.

The decoder 80 receives a bitstream 801 comprising encoding units, each one being composed of a header containing information on encoding parameters and a body containing the encoded video data. As explained with respect to FIG. 3, the encoded video data is entropy encoded, so the received encoded video data should be entropy decoded (802), dequantized (803) and then a reverse transform (804) has to be applied.

In particular, when the received encoded video data corresponds to a residual block of a current block to decode, the decoder also decodes motion prediction information from the bitstream, so as to find the reference area used by the encoder.

The bitstream also comprises, for example in each slice header in this embodiment, an indication of whether a temporal motion vector predictor or a spatial motion vector predictor has been applied for each block of the slice.

The module 812 obtains such an indication regarding temporal vs spatial motion vector prediction, for example in the form of a binary flag.

The module 812 transmits this information to module 810 which applies the motion vector decoding for each block of the current image to decode. Module 810 applies the motion vector predictor decoding to determine the index of the motion vector predictor used for the current block.

The motion vector predictor is obtained from a set of motion vectors which are extracted from the motion vectors field 811. If a spatial motion vector predictor has been used, the index of the selected motion vector predictor, among the set of spatial motion vector predictors for the current block, is obtained by entropy decoding (802). If it is determined in module 812 that a temporal motion vector predictor has been used, if only one single temporal motion vector predictor is considered, which is the motion vector of the co-located block in the reference frame, then the temporal motion vector predictor can be retrieved straightforwardly from the motion vectors field 811.

Figure 9:
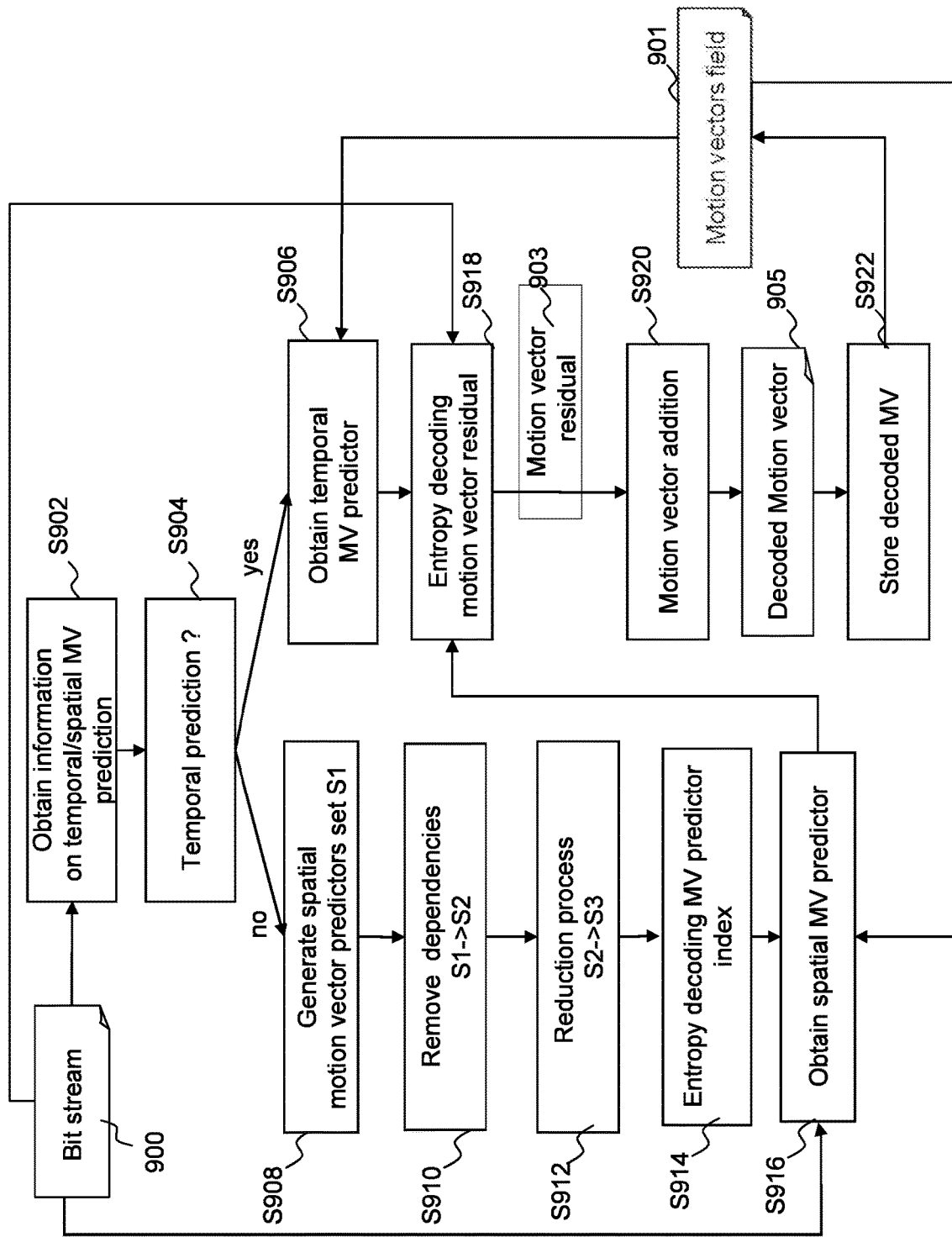
FIG. 9 illustrates an embodiment of the motion vector decoding of FIG. 8.

FIG. 9 described hereafter details the motion vector predictor decoding in an embodiment.

Once the index of the motion vector predictor for the current block has been obtained, the actual value of the motion vector associated with the current block can be decoded and used to apply reverse motion compensation (806). The reference area indicated by the decoded motion vector is extracted from a reference image (808) to finally apply the reverse motion compensation 806.

In case an Intra prediction has been applied, an inverse Intra prediction is applied by module 805.

Finally, a decoded block is obtained. A deblocking filter 807 is applied, similarly to the deblocking filter 315 applied at the encoder. A decoded video signal 809 is finally provided by the decoder 80.

In case of transmission errors and packet losses, typically some parts of the bitstream cannot be decoded and the resulting video signal 809 will contain errors such as frozen parts. However, thanks to the fact that no spatial motion vector predictors coded with respect to motion vectors coming from other slices are used in the reduction process, the motion vector indexes can always be decoded and therefore the decoder can parse correctly the received video data for a slice, even if transmission losses occurred for other slices.

FIG. 9 details the embodiment of the motion vector decoding (module 810 of FIG. 8) when the process of reduction of the set of motion vector predictors is applied. All the steps of the algorithm represented in FIG. 9 can be implemented in software and executed by the central processing unit 1111 of the device 1000.

The module 810 receives as inputs the bitstream 900 and a motion vector field 901, comprising the motion vectors computed for the blocks of the digital images and of the slices previously decoded, and used as reference.

For a current block to decode belonging to a current slice, an indication on whether a spatial or a temporal prediction was used is obtained (S902). If such an indication has been encoded in the slice header as a binary flag, the value of this flag is decoded.

If the binary flag indicates that a spatial motion vector predictor has been used (answer 'no' to test S904), step S904 is followed by step S908 of generation of the spatial motion vector predictors set S1. This step is implemented similarly to step S400 described with respect to FIG. 4.

Next, a step of removal of dependencies, analogous to the step S402 applied at the encoder, is applied, to obtain a set of spatial motion vector predictors all of which are dependent on data received for the current slice. In particular, any motion vector of the set of spatial motion vector predictors that has been coded using a temporal predictor or a predictor coming from a different slice is either removed (embodiment of FIG. 6) or replaced by a motion vector generated by the decoder (embodiment of FIG. 7). Such a replacement motion vector may be computed using some further information decoded from the bitstream, such as a predetermined vector V which can be extracted from the slice header. It is assumed that the decoder applies the same removal process as the encoder, so as to obtain the same set of spatial motion vector predictors S2.

Similarly to the process implemented at the encoder, step S910 is followed by step S912 applying a reduction process to the set of motion vector predictors S2, to obtain a reduced set of spatial motion vector predictors S3.

The number of motion vectors of the reduced set of spatial motion vector predictors set S3 is used as a parameter to retrieve, via entropy decoding (S914), the index of the motion vector predictor for the current block.

The corresponding spatial motion vector predictor is retrieved (S916) from the motion vectors field 901.

Step S916 is followed by the step S918 described hereafter.

If the binary flag indicates a temporal prediction (answer 'yes' to test S904), the temporal motion vector predictor is obtained (S906) from the motion vectors field 901. If a unique temporal motion vector predictor has been used by the encoder, which is the motion vector of the co-located block of the reference image, then this motion vector is retrieved. If there are several possible temporal motion vector predictors, then a temporal motion vector index is decoded and the corresponding motion vector is retrieved.

Step S906 is followed by step S918 of entropy decoding of the motion vector residual. Note also that the entropy decoding can be applied before obtaining a motion vector predictor index.

The motion vector residual 903 obtained is added to the motion vector predictor (either temporal predictor or spatial predictor) in step S920 to obtain a decoded motion vector 905. The decoded motion vector is stored (S922) in the motion vectors field 901.

Other alternative embodiments may be envisaged, such as for example using, in the generation of a motion vector predictor to replace a spatial motion vector predictor encoded using data from another slice, any combination of motion vectors already decoded of the current slice.

More generally, any modification or improvement of the above-described embodiments, that a person skilled in the art may easily conceive should be considered as falling within the scope of the invention.

What we claim is:

1. A method of decoding a bitstream comprising an encoded sequence of digital images, at least one portion of an image in the encoded sequence being encoded by motion compensation, the method comprising:

generating, from among spatial motion information predictors respectively associated with predetermined image portions adjacent to an image portion to be decoded, a set of spatial motion information predictors for the image portion to be decoded, using at least one condition to determine that a spatial motion information predictor is not includable in the set, at least one said condition being a condition to exclude from the generated set of spatial motion information predictors a spatial motion information predictor that is a duplicate of another spatial motion information predictor, wherein one of the predetermined image portions is situated left of the image portion to be decoded;

generating a temporal motion information predictor, the generation of the temporal motion information predictor being carried out separately from the generation of the set of spatial motion information predictors so that the temporal motion information predictor is not subjected to the duplicate exclusion condition used for the spatial motion information predictors and may be a duplicate of a spatial motion information predictor in the generated set;

obtaining from the bitstream information identifying a motion information predictor for the image portion to be decoded, the motion information predictor identified by said information being one of (i) a motion information predictor from among the generated set, (ii) the temporal motion information predictor, and (iii) a zero motion information predictor as a replacement for a non-includable spatial motion information predictor; and decoding the image portion to be decoded in dependence upon the identified motion information predictor.

2. A device for decoding a bitstream comprising an encoded sequence of digital images, at least one portion of an image in the encoded sequence being encoded by motion compensation, the device comprising:

a first generator which generates, from among spatial motion information predictors respectively associated with predetermined image portions adjacent to an image portion to be decoded, a set of spatial motion information predictors for the image portion to be decoded, using at least one condition to determine that a spatial motion information predictor is not includable in the set, at least one said condition being a condition to exclude from the generated set of spatial motion information predictors a spatial motion information predictor that is a duplicate of another spatial motion information predictor, wherein one of the predetermined image portions is situated left of the image portion to be decoded;

a second generator which generates a temporal motion information predictor, the second generator generating the temporal motion information predictor separately from the generation by the first generator of the set of spatial motion information predictors so that the temporal motion information predictor is not subjected to the duplicate exclusion condition used for the spatial motion information predictors and may be a duplicate of a spatial motion information predictor in the generated set;

a predictor identifier which obtains from the bitstream information identifying a motion information predictor for the image portion to be decoded, the motion information predictor identified by said information being one of (i) a motion information predictor from among the generated set, (ii) the temporal motion information predictor, and (iii) a zero motion information predictor as a replacement for a non-includable spatial motion information predictor; and a decoder which decodes the image portion to be decoded in dependence upon the identified motion information predictor.

3. A non-transitory computer-readable medium storing a program which, when executed by a computer, causes the computer to decode a bitstream comprising an encoded sequence of digital images, at least one portion of an image in the encoded sequence being encoded by motion compensation, the program comprising:

a code portion which generates, from among spatial motion information predictors respectively associated with predetermined image portions adjacent to an image portion to be decoded, a set of spatial motion information predictors for the image portion to be decoded, using at least one condition to determine that a spatial motion information predictor is not includable in the set, at least one said condition being a condition to exclude from the generated set of spatial motion information predictors a spatial motion information predictor that is a duplicate of another spatial motion information predictor, wherein one of the predetermined image portions is situated left of the image portion to be decoded;

a code portion which generates a temporal motion information predictor, the generation of the temporal motion information predictor being carried out separately from the generation of the set of spatial motion information predictors so that the temporal motion information predictor is not subjected to the duplicate exclusion condition used for the spatial motion information predictors and may be a duplicate of a spatial motion information predictor in the generated set;

a code portion which obtains from the bitstream information identifying a motion information predictor for the image portion to be decoded, the motion information predictor identified by said information being one of (i) a motion information predictor from among the generated set, (ii) the temporal motion information predictor, and (iii) a zero motion information predictor as a replacement for a non-includable spatial motion information predictor; and a code portion which decodes the image portion to be decoded in dependence upon the identified motion information predictor.

* * * * *